United States Patent
Natarajan

(10) Patent No.: US 7,653,383 B2
(45) Date of Patent: Jan. 26, 2010

(54) METHOD AND APPARATUS FOR REMOTE DATA ACCESS IN A MOBILE COMMUNICATION DEVICE

(75) Inventor: Vimalkaushik Natarajan, Grayslake, IL (US)

(73) Assignee: Motorola, Inc., Schaumburg, IL (US)

( * ) Notice: Subject to any disclaimer, the term of this patent is extended or adjusted under 35 U.S.C. 154(b) by 1114 days.

(21) Appl. No.: 10/377,464

(22) Filed: Feb. 28, 2003

(65) Prior Publication Data

US 2004/0171370 A1 Sep. 2, 2004

(51) Int. Cl.
- H04M 3/16 (2006.01)
- H04L 29/06 (2006.01)
- H04M 3/42 (2006.01)
- H04M 11/10 (2006.01)
- H04B 1/38 (2006.01)

(52) U.S. Cl. ........................ 455/419; 455/411; 455/413; 455/414.3; 455/415; 455/417; 455/566

(58) Field of Classification Search ................. 455/410, 455/411, 413, 418, 420, 412.1, 414.3, 414.4, 455/41.2, 419, 415, 417, 566; 379/201, 100.15, 379/100.16

See application file for complete search history.

(56) References Cited

U.S. PATENT DOCUMENTS

| | | | | |
|---|---|---|---|---|
| 5,493,609 A * | 2/1996 | Winseck et al. | .......... | 379/93.08 |
| 5,590,406 A * | 12/1996 | Bayley et al. | ................ | 370/493 |
| 5,675,421 A * | 10/1997 | Ouchi | .......... | 358/402 |
| 5,884,159 A * | 3/1999 | Thro et al. | ................ | 455/412.1 |
| 6,009,325 A * | 12/1999 | Retzer et al. | ................ | 455/434 |
| 6,041,111 A * | 3/2000 | Shelton | .......... | 379/201.04 |
| 6,144,464 A * | 11/2000 | Rupp et al. | ................ | 358/442 |
| 6,148,212 A * | 11/2000 | Park et al. | ................ | 455/456.1 |
| 6,205,321 B1 * | 3/2001 | Rutledge | .......... | 340/7.2 |
| 6,295,457 B1 * | 9/2001 | Narayanaswamy | .......... | 455/466 |
| 6,301,263 B1 | 10/2001 | Maggenti | | |
| 6,470,190 B2 * | 10/2002 | Karhu | .......... | 455/550.1 |
| 6,473,613 B2 * | 10/2002 | Beamish et al. | .......... | 455/435.1 |
| 6,577,861 B2 * | 6/2003 | Ogasawara | .......... | 455/419 |
| 6,662,023 B1 * | 12/2003 | Helle | .......... | 455/558 |
| 6,741,851 B1 * | 5/2004 | Lee et al. | .......... | 455/410 |
| 6,871,063 B1 * | 3/2005 | Schiffer | .......... | 455/410 |
| 6,904,277 B2 * | 6/2005 | Tsutsumi et al. | .......... | 455/411 |
| 6,914,891 B2 * | 7/2005 | Ha et al. | .......... | 370/338 |
| 7,007,061 B1 * | 2/2006 | Moon | .......... | 709/203 |
| 7,016,359 B2 * | 3/2006 | Naim et al. | .......... | 370/401 |
| 7,127,242 B1 * | 10/2006 | Olson | .......... | 455/426.1 |
| 7,146,191 B2 * | 12/2006 | Kerner et al. | .......... | 455/558 |
| 7,155,213 B1 * | 12/2006 | Almeda et al. | .......... | 455/419 |
| 7,499,699 B2 * | 3/2009 | Rodriguez et al. | .......... | 455/420 |
| 7,505,763 B2 * | 3/2009 | Rodriguez et al. | .......... | 455/420 |
| 7,512,098 B2 * | 3/2009 | Jiang et al. | .......... | 370/329 |
| 2001/0041592 A1 * | 11/2001 | Suonpera et al. | .......... | 455/557 |

(Continued)

*Primary Examiner*—Olisa Anwah
*Assistant Examiner*—Lisa Hashem
(74) *Attorney, Agent, or Firm*—Gary J. Cunningham

(57) ABSTRACT

A method and apparatus for remote data access in a mobile communication device. A voice call can be initiated between a first voice and data wireless device and a second voice and data wireless device. A data access request can be communicated between the first voice and data wireless device and the second voice and data wireless device. The voice call can be switched to a data call to establish a data access connection. Data can then be transferred between the first voice and data wireless device and the second voice and data wireless device.

12 Claims, 8 Drawing Sheets

U.S. PATENT DOCUMENTS

| | | | |
|---|---|---|---|
| 2001/0055964 A1* | 12/2001 | Karhu | 455/419 |
| 2002/0055350 A1* | 5/2002 | Gupte et al. | 455/412 |
| 2002/0098831 A1* | 7/2002 | Castell et al. | 455/413 |
| 2002/0098865 A1* | 7/2002 | Jang et al. | 455/557 |
| 2002/0198019 A1 | 12/2002 | Naim et al. | |
| 2003/0087627 A1* | 5/2003 | Cannon | 455/404 |
| 2003/0112929 A1* | 6/2003 | Chuang | 379/88.13 |
| 2004/0092252 A1* | 5/2004 | Gustavsson et al. | 455/412.2 |
| 2004/0176071 A1* | 9/2004 | Gehrmann et al. | 455/411 |
| 2004/0203601 A1* | 10/2004 | Morriss et al. | 455/411 |
| 2004/0235424 A1* | 11/2004 | Kim | 455/68 |
| 2005/0037810 A1* | 2/2005 | Bryson | 455/557 |
| 2005/0186941 A1* | 8/2005 | Gault et al. | 455/411 |
| 2006/0079203 A1* | 4/2006 | Nicolini | 455/411 |
| 2007/0271234 A1* | 11/2007 | Ravikiran | 707/3 |

* cited by examiner

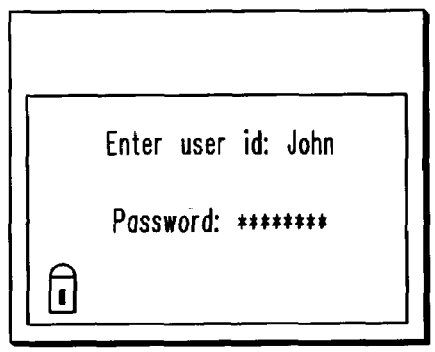
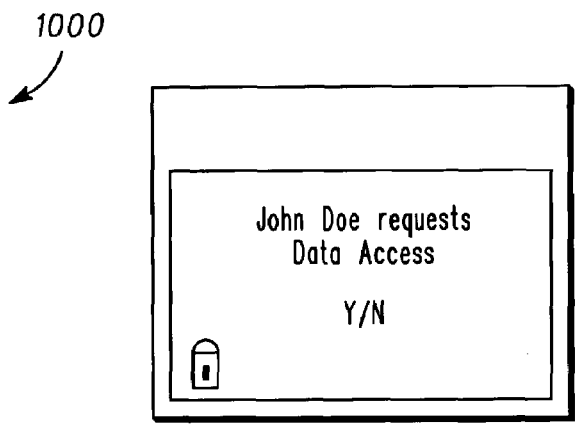
FIG. 10             FIG. 11
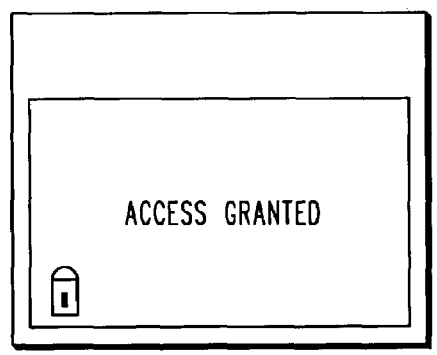
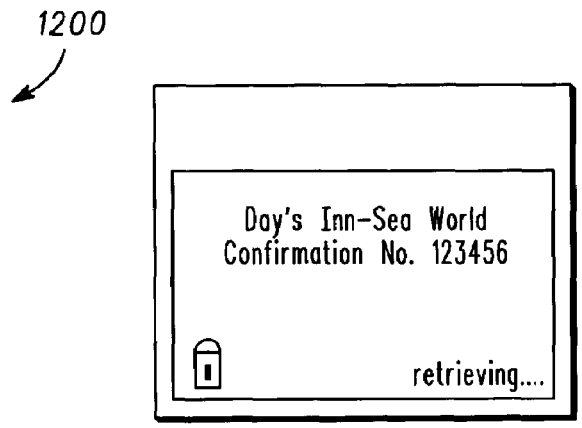
FIG. 12             FIG. 13

METHOD AND APPARATUS FOR REMOTE DATA ACCESS IN A MOBILE COMMUNICATION DEVICE

BACKGROUND

1. Field of Invention

The present invention is directed to a method and apparatus for remote data access in a mobile communication device. In particular, the present invention is directed to data access between two voice and data wireless devices on a wireless network.

2. Description of Related Art

Presently, portable devices such as cellular phones and personal digital assistants can be used for a variety of applications. For example, cellular phones can include a phonebook or contact book containing names and phone numbers of personal and business acquaintances. Cellular phones may also include calendar or datebook information. This datebook information can include scheduled appointments such as meetings, vacation plans, important dates, and other appointments. Appointment entries can include appointment dates, times, locations, contact information, confirmation numbers, and other useful appointment information.

Unfortunately, all of the information stored on a portable device is local to the portable device. In particular, the information is stored in a portable device memory that can only be accessed using the portable device. Thus, an individual cannot access information stored on the portable device without the individual being local to the portable device. For example, if a portable device user leaves the portable device at home, the user cannot access information on the portable device without going home to retrieve the portable device. Another example is when a first portable device user has information on their portable device that a second portable device user requires. If the first portable device user cannot answer a call from the second portable device user, the second portable device user cannot obtain the required information from the first portable device user. A further example is when a portable device contains important information, but the portable device is lost. Thus, the important information cannot be retrieved from the portable device.

Thus, there is a need for the ability to access data on a portable device without having physical access to the portable device. Also, there is a need to access data on a portable device when the user of the portable device cannot answer an incoming call. Furthermore, there is a need to have access to a remote portable device. These, and other needs can be solved by the present disclosure.

BRIEF DESCRIPTION OF THE DRAWINGS

The preferred embodiments of the present invention will be described with reference to the following figures, wherein like numerals designate like elements, and wherein:

FIGS. 9-13 are exemplary illustrations of screens that can be displayed on a voice and data wireless device according to preferred embodiments.

DETAILED DESCRIPTION OF PREFERRED EMBODIMENTS

Figure 1:
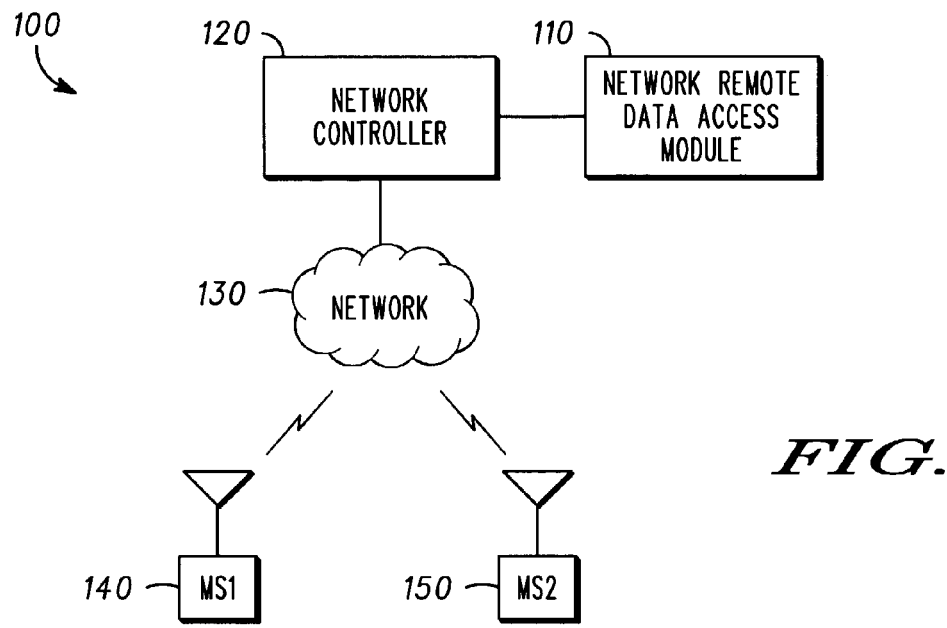
FIG. 1 is an exemplary block diagram of a system according to a first embodiment.

The present disclosure provides a method and apparatus for remote data access in a mobile communication device. According to a preferred embodiment, a voice call can be initiated between a first voice and data wireless device and a second voice and data wireless device. A data access request can be communicated between the first voice and data wireless device and the second voice and data wireless device. The voice call can be switched to a data call to establish a data access connection. Data can then be transferred between the first voice and data wireless device and the second voice and data wireless device.

According to another embodiment, the present disclosure provides a method at a network controller of remote data access between a first voice and data wireless device and a second voice and data wireless device remote from the first voice and data wireless device. The method can include receiving a call initiation request from the first voice and data wireless device at the network controller, initiating a voice call to the second voice and data wireless device, determining a data access request, and switching the voice call to a data call to establish a data access connection. The method can also include determining if the second voice and data wireless device is camped on the network. The method can additionally include determining whether either or both of the first and the second voice and data wireless device are subscribed for a data access request service. Determining a data access request can include receiving a data access request from the first voice and data wireless device and acknowledging the data access request. The method can further include sending a data access option to the first voice and data wireless device and receiving a data access selection from the first voice and data wireless device. Sending can include sending a feature option to the first voice and data wireless device the feature option including the data access request option and a voice mail request option. The method can also include sending a security prompt to the first voice and data wireless device and receiving a passcode from the first voice and data wireless device. The method can additionally include determining an end of the data access connection by receiving an acknowledge data complete signal. The network controller can be a base transceiver station on a cellular network.

According to another embodiment, the present disclosure can provide a method at a first voice and data wireless device of remote data access from the first voice and data wireless device to a second voice and data wireless device remote from the first voice and data wireless device on a network. The method can include sending a call initiation request for a call to the second voice and data wireless device from the first voice and data wireless device, connecting a voice call, sending a data access request, and switching the voice call to a data call to establish a data access connection. The method can also include receiving an option for a data access request. Sending a data access request can include sending the data access request in response to the option for a data access request. Receiving can include receiving an option for features, the option for features including the option for a data access request and an option for a voice mail request. The method can additionally include receiving a security prompt and sending a passcode in response to the security prompt. The method can further include displaying a security prompt input request on a display of the first voice and data wireless device, receiving security information on an input of the first voice and data wireless device, and transmitting the security information to the second voice and data wireless device. The method can also include sending a data query to the second voice and data wireless device and receiving requested data from the second voice and data wireless device. The method can additionally include sending an acknowledge data complete signal to signal an end of the data access connection.

According to another embodiment, the present disclosure can provide a method of remote data access at a first voice and data wireless device from a second voice and data wireless device remote from the first voice and data wireless device on a network. The method can include receiving an incoming voice call from the second voice and data wireless device, receiving a data access request, and switching the voice call to a data call to establish a data access connection. The method can also include determining whether the second voice and data wireless device is subscribed for a data access request service. The method can additionally include sending a data access request option to the second voice and data wireless device and receiving the data access request from the second voice and data wireless device in response to the data access request option. Sending can include sending a feature option, the feature option including the data access request option and a voice mail request option. The method can further include authenticating the second voice and data wireless device as a device authorized to access data on the first voice and data wireless device by determining a valid voice and data wireless device identification from the second voice and data wireless device based on at least one of a caller identification number and a subscriber identity module identification. The method can also include authenticating the second voice and data wireless device as a device authorized to access data on the first voice and data wireless device by sending a security request to the second voice and data wireless device and receiving security information from the second voice and data wireless device. The method can additionally include receiving a data query from the second voice and data wireless device. The method can further include sending an acknowledge data complete signal to signal end of the data access connection. The method can also include setting an automatic remote data access mode in the first mobile communication device.

According to another embodiment, the present invention provides a method of remote data access from a first mobile communication device. The method can include receiving a remote data access request from a remote second mobile communication device during a voice call, sending a security prompt to the remote second mobile communication device, receiving a passcode from the remote second mobile communication device, granting access for the remote second mobile communication device, switching the voice call to a data call, receiving a specific data access request from the remote second mobile communication device for requested specific data, and transferring the requested specific data to the remote second mobile communication device. The method can also include displaying remote data access information on the first mobile communication device. The method can additionally include displaying remote data access information on the second mobile communication device. The requested specific data can be contact book data, date book data, or any other data. The method can further include setting a permissive remote data access mode in the first mobile communication device. The method can also include receiving a user input of specific mobile communication device data grant identifiers, the specific mobile communication device data grant identifiers identifying specific mobile communication devices with permission to remotely access data in the first mobile communication device. The method can additionally include receiving a user grant of data access at the first mobile communication device.

According to another embodiment, the present disclosure provides a system for remote data access between a first voice and data wireless device and a second voice and data wireless device. The system can include a network, a network controller coupled to the network, the controller configured to control operations on the network, and a remote data access module coupled to the controller, the remote data access module configured to receive a call initiation request from the first voice and data wireless device at the network controller, initiate a voice call to the second voice and data wireless device, determine a data access request, and switch the voice call to a data call to establish a data access connection. The remote data access module can also determine whether the second voice and data wireless device is subscribed for a data access request service. The remote data access module can be further configured to send a feature option to the first voice and data wireless device the feature option including a data access request option and a voice mail request option, and receive a data access selection from the first voice and data wireless device. The remote data access module can be additionally configured to send a security prompt to the first voice and data wireless device and receive a passcode from the first voice and data wireless device.

According to another embodiment, the present disclosure provides a voice and data wireless device. The voice and data wireless device can include a transceiver, a controller coupled to the transceiver, the controller configured to control operations of the voice and data wireless device, input and output circuitry coupled to the controller, and a remote data access module coupled to the controller, the remote data access module being configured to send a call initiation request for a call to a second voice and data wireless device, connect a voice call, send a data access request, and switch the voice call to a data call to establish a data access connection. The remote data access module can be further configured to receive an option for features, the option for features including an option for a data access request and an option for a voice mail request and configured to send the data access request by sending the data access request in response to the option for features. The input and output circuitry can include a display and a user input. The remote data access module can also be configured to display a security prompt input request on the display, receive security information on the user input, and transmit the security information via the transceiver to the second voice and data wireless device. The remote data access module can be additionally configured to send a data query to the second voice and data wireless device and receive requested data from the second voice and data wireless device.

According to another embodiment, the present disclosure provides a voice and data wireless device. The voice and data wireless device can include a transceiver, a controller coupled to the transceiver, the controller configured to control operations of the voice and data wireless device, a memory coupled to the controller, input and output circuitry coupled to the controller, and a remote data access module coupled to the controller, the remote data access module being configured to receive an incoming voice call from a second voice and data wireless device, receive a data access request, and switch the voice call to a data call to establish a data access connection. The remote data access module can be further configured to send a feature option to the second voice and data wireless device, the feature option including a data access request option and a voice mail request option and configured to receive the data access request from the second voice and data wireless device in response to the feature option. The remote data access module can also be configured to authenticate the second voice and data wireless device as a device authorized to access data on the first voice and data wireless device. The remote data access module can additionally be configured to receive a data query from the second voice and data wireless device. The remote data access module can be further configured to set an automatic remote data access mode.

Features of the present disclosure are preferably implemented as a software or hardware upgrade at a network station such as a network base transceiver station. However, features of the present disclosure may also be implemented by other means. For example, features may be implemented as software upgrades to a portable device such as a wireless voice and data communication device.

Thus, among other benefits, the present disclosure can provide data access on a portable device without requiring physical access to the portable device. The present disclosure can also provide for data access on a portable device when the user of the portable device cannot answer an incoming call. The present disclosure can further provide for access to a remote portable device. The present disclosure can additionally provide for remote data access from one voice and data wireless device using another voice and data wireless device. These and other needs can be solved by the present disclosure.

FIG. 1 is an exemplary block diagram of a system 100 according to one embodiment. The system 100 can include a network remote data access module 110, a network controller 120, a network 130, and one or more terminals 140 and 150 such as voice and data wireless devices. The voice and data wireless devices 140 and 150 may be terminals such as mobile stations. For example, the voice and data wireless devices 140 and 150 may be wireless telephones, cellular telephones, personal digital assistants, or any other device that is capable of sending and receiving voice and data signals over a wireless network.

In an exemplary embodiment, network remote data access module 110 and the controller 120 are connected to the network 130, The controller 120 and/or the network remote data access module 110 may be included in a base transceiver station, a service center, or any other device on the network 130. The network 130 may include any type of network that is capable of sending and receiving voice and data wireless communication signals. For example, the network 130 may include a data network, such as the Internet, an Intranet, a local area network (LAN), a wide area network (WAN), a cable network, and other like communication systems. The network 130 may also include a telecommunications network, such as a local telephone network, long distance telephone network, cellular telephone network, satellite communications network, cable television network and other like communications systems. Furthermore, the network 130 may include more tan one network and may include a plurality of different types of networks. Thus, the network 130 may include a plurality of data networks, a plurality of telecommunications networks, a combinatioft of data and telecommunications networks and other like communication systems. Preferably, the network 130 is a wireless network. The network remote data access module 110 may reside as hardware or software in the controller 120, as a stand-alone module on the network 130, or in any other device on the network 130.

In operation, the controller 120 can control operations on the network 130. The voice and data wireless devices 140 and 150 can transmit and receive wireless signals to and from the network 130. For example, the voice and data wireless device 140 can connect a voice call with the voice and data wireless device 150. Thus, users of the voice and data wireless devices 140 and 150 can audibly communicate with each other. Also, the voice and data wireless device 140 can connect a data call with the voice and data wireless device 150. Thus, users of the voice and data wireless devices 140 and 150 can send and receive data to and from each other.

According to a preferred embodiment, the controller 120 or the network remote data access module 110 can perform a remote data access function for the voice and data wireless devices 140 and 150 on the network 130. For example, the controller 120 can control remote data access between a first voice and data wireless device 140 and a second voice and data wireless device 150 remote from the first voice and data wireless device 140. In particular, the controller 120 can receive a call initiation request from the first voice and data wireless device 140 at the controller 120. For example, the first voice and data wireless device 140 may place a call to the second voice and data wireless device 150. The controller 120 can then initiate a voice call to the second voice and data wireless device 150. The controller 120 can then determine if the second voice and data wireless device 150 is camped on the network. For example, if the second voice and data wireless device 150 is turned off or not in range of the network, the second voice and data wireless device 150 will not be camped on the network. If a user of the second voice and data wireless device does not answer the call, the controller 120 can determine whether the second voice and data wireless device 150 is subscribed for a data access request service. A subscription may or may not be necessary for use of the data access request service. The controller 120 can then determine a data access request. For example, the controller 120 can determine a data access request by receiving a data access request from the first voice and data wireless device 140 and acknowledging the data access request. As another example, the controller 120 can send a feature option to the first voice and data wireless device 140 the feature option including a data access request option and a voice mail request option. The controller 120 can then receive a data access selection from the first voice and data wireless device 140. Alternately, the controller 120 can receive a voicemail selection from the first voice and data wireless device 140.

For additional security, the controller 120 can send a security prompt to the first voice and data wireless device 140 and receive a passcode from the first voice and data wireless device 140. Alternately, the controller 120 can automatically authenticate the first voice and data wireless device 140 based on identification information received from the first voice and data wireless device 140 such as a caller identification, identity module information, or any other information. The controller 120 can then switch the voice call to a data call to establish a data access connection. After data is transferred between the second voice and data wireless device 140 and the first voice and data wireless device, the controller 120 can determine an end of the data access connection by receiving an acknowledge data complete signal.

Furthermore, the controller 120 can have the capability of processing different queries of different wireless device manufacturer formats. For example, the controller 120 can check the syntax of a data query placed by the voice and data wireless device 140 and convert the query to a compatible format for processing and/or use by the second voice and data wireless device 150.

Figure 2:
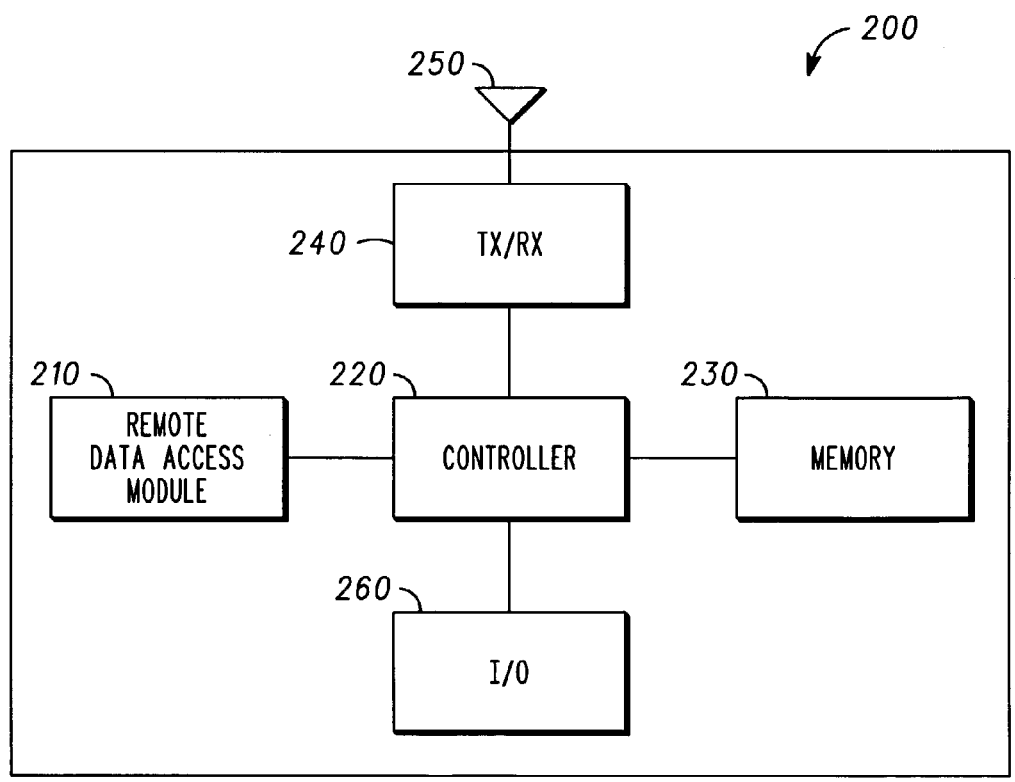
FIG. 2 is an exemplary block diagram of a voice and data wireless device according to a preferred embodiment.

FIG. 2 is an exemplary block diagram of a voice and data wireless device 200, such as a voice and data wireless device 140, according to a preferred embodiment. The voice and data wireless device 200 can include a remote data access module 210, a controller 220, a memory 230, a transceiver 240, an antenna 250, and input and output circuitry 260. The memory 230 may be a random access memory, a read only memory, an optical memory, or any other memory. The transceiver 240 may include a transmitter and/or a receiver. The input and output circuitry 260 can include a microphone, a display, a speaker, a user input such as a keypad, or any other input and output circuitry. The remote data access module 210 may reside as software in the memory 230, as hardware or software in the controller 220, or as a stand-alone module in the voice and data wireless device 200.

In operation, the input and output circuitry 260 can accept various forms of input and output signals. For example, the input and output circuitry 260 can receive and output audio signals and data signals. The memory 230 can store data and software used in the voice and data wireless device 200. The transceiver 240 can transmit and/or receive data over a wireless network such as network 130. The controller 220 can control the operation of the voice and data wireless device 200. The remote data access module 210 can perform remote data access functions on the voice and data wireless device 200.

According to one example, the voice and data wireless device 200 may request data from a second voice and data wireless device such as the voice and data wireless device 150. Accordingly, the controller 220 may employ the remote data access module 210 to send a call initiation request for a call to a second voice and data wireless device, connect a voice call, and send a data access request. The controller 220 may receive an option for features, the option for features including an option for a data access request and an option for a voice mail request and send a data access request in response to the option for features. The controller 220 can also receive a security prompt and send a passcode in response to the security prompt. The controller 220 can additionally display a security prompt input request on a display 260 of the voice and data wireless device 200, receive security information on an input 260 of the first voice and data wireless device 200, and transmit the security information to the second voice and data wireless device. For example, the controller 220 can receive the security information from a user via a keyboard on the voice and data wireless device 200. Alternately, the voice and data wireless device 200 may be automatically authenticated for remote data access and the controller 220 can automatically engage in a data access request.

The controller 220 can receive an acknowledgement of the data access request. The controller 220 can also receive a user grant of data access from the second mobile communication device. The controller 220 can then switch the voice call to a data call to establish a data access connection. The controller 220 can then send a data query to the second voice and data wireless device and receive requested data from the second voice and data wireless device. At the end of a data transfer, the controller 220 can send an acknowledge data complete signal to signal an end of the data access connection.

According to another example, the voice and data wireless device 200 may be the recipient of a wireless remote data access request from a second voice and data wireless device such as the voice and data wireless device 150. Accordingly, the controller 220 can receive an incoming voice call from the second voice and data wireless device and receive a data access request. The controller 220 may connect a voice call with the second voice and data wireless device. The controller 220 may also determine whether the second voice and data wireless device is subscribed for a data access request service. The controller 220 may additionally send a data access request option to the second voice and data wireless device and receive the data access request from the second voice and data wireless device in response to the data access request option. The controller 220 may send the data access request option by sending a feature option, the feature option including the data access request option and a voice mail request option. The controller 220 may also authenticate the second voice and data wireless device as a device authorized to access data on the first voice and data wireless device. For example, the controller 220 can determine a valid voice and data wireless device identification from the second voice and data wireless device where the valid voice and data wireless device identification can be a caller identification number, a subscriber identity module identification, or any other voice and data wireless device identification. As another example of authentication, the controller 220 can send a security request to the second voice and data wireless device and receive security information from the second voice and data wireless device.

The controller 220 can then grant permission for data access to the second voice and data wireless device. The controller 220 can then switch the voice call tQ a data call to establish a data access connection. The controller 220 may then receive a data query from the second voice and data wireless device. The controller 220 can send an acknowledge data complete signal to signal an end of the data access connection. An automatic remote data access mode may be set in the mobile communication device 200 to avoid the need for user authentication, password entry, or other portions or combinations of security measures.

According to another embodiment, controller 120, controller 220, network remote data access module 110, or remote data access module 210 may receive a remote data access request from a remote second mobile communication device during a voice call, send a security prompt to the remote second mobile communication device, receive a passcode from the remote second mobile communication device, grant access for remote data access to the remote second mobile communication device, switch the voice call to a data call, receive a specific data access request from the remote second mobile communication device for requested specific data, and transfer the requested specific data to the remote second mobile communication device. Remote data access information can be displayed on one of the mobile communication devices. The requested specific data may be contact book data, date book data, or any other useful data. A permissive remote data access mode may be set in a mobile communication device to allow automatic remote data access. A user input of specific mobile communication device data grant identifiers may be received. The specific mobile communication device data grant identifiers can identify specific mobile communication devices with permission to remotely access data in the first mobile communication device. A user grant of data access can also be received at the first mobile communication device.

Figure 3:
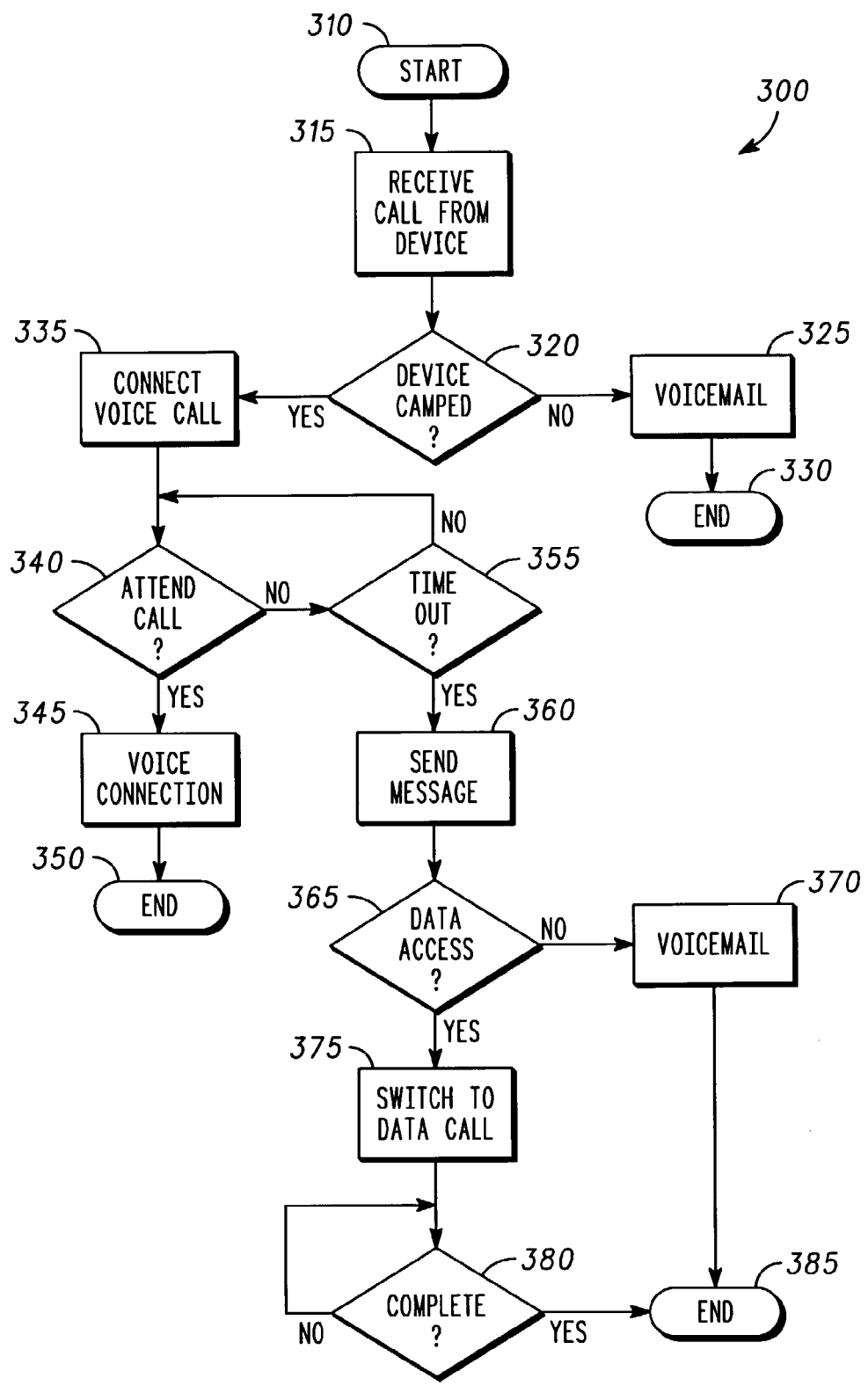
FIG. 3 is an exemplary flowchart outlining the operation of a network remote data access module according to a first embodiment.

FIG. 3 is an exemplary flowchart 300 outlining the operation of the network remote data access module 110 according to a preferred embodiment. In step 310, the flowchart begins. In step 315, the network remote data access module 110 can receive a call from a device such as a voice and data wireless device 200 requesting a connection to another device such as a voice and data wireless device 150. In step 320, the network remote data access module 110 can determine if the device is camped on a network such as network 130. If not, in step 325, the network remote data access module 110 can connect the device with a voicemail service and the flowchart can end in step 330. If the device is camped, in step 335, the network remote data access module 110 can connect a voice call between the first device and the second device. In step 340, the network remote data access module 110 can determine if the second device has answered the call. If the second device has answered the call, in step 345, the network remote data access module 110 establishes a voice connection between the devices and the flowchart ends in step 350. If the second device has not answered the call in step 340, in step 355, the network remote data access module 110 can determine if the time to answer the call has ended. For example, the time can end based upon a set time period, based upon a set ring count, or based on any other useful timeout means. If the time out has not been achieved, the network remote data access module continues to monitor the pending call in step 340. If the time out has been achieved, in step 360, the network remote data access module 110 sends a message to the first device asking if the device desires remote data access. For example, the network remote data access module may give a data access option, a voicemail option, or other options useful for when a call recipient does not answer an incoming call. In step 365, the network remote data access module 110 determines if a data access option is selected. If not, or if a voicemail option is selected, in step 370, the network remote data access module 110 sends the caller to voicemail and in step 385, the flowchart ends. If a caller selects a data access option, in step 375, the network remote data access module 110 switches the voice call to a data call to transfer data between the devices. In step 380, the network remote data access module 110 determines if the data access is complete. If not, the network remote data access module 110 continues to monitor whether the data access is complete. If data access is complete, in step 385, the flowchart ends.

Figure 4:
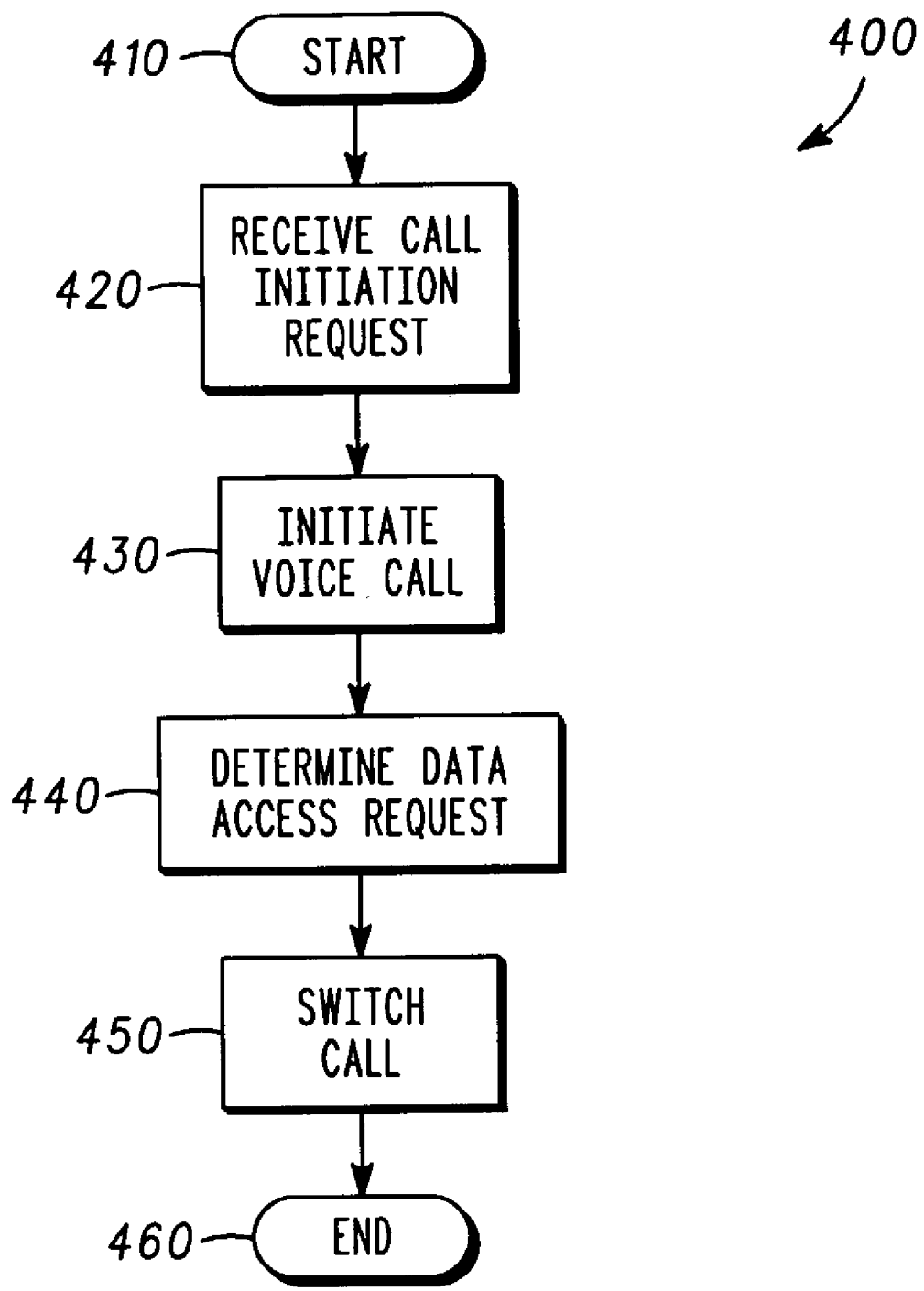
FIG. 4 is an exemplary flowchart outlining the operation of the network remote data access module according to a second embodiment.

FIG. 4 is an exemplary flowchart 400 outlining the operation of the network remote data access module 110 according to a second embodiment. In step 410, the flowchart begins. In step 420, the network remote data access module 110 receives a call initiation request at the network controller 120 from a first voice and data wireless device such as the voice and data wireless device 200. In step 430, the network remote data access module 110 initiates a voice call to a second voice and data wireless device. In step 440, the network remote data access module 110 determines that data access is requested. In step 450, the network remote data access module 110 switches the voice call to a data call to establish a data access connection. In step 460, the flowchart ends. Additional features of the flowchart 300 may be incorporated into the flowchart 400 for additional functionality, however such features are not necessary for operation of the flowchart 400.

Figure 5:
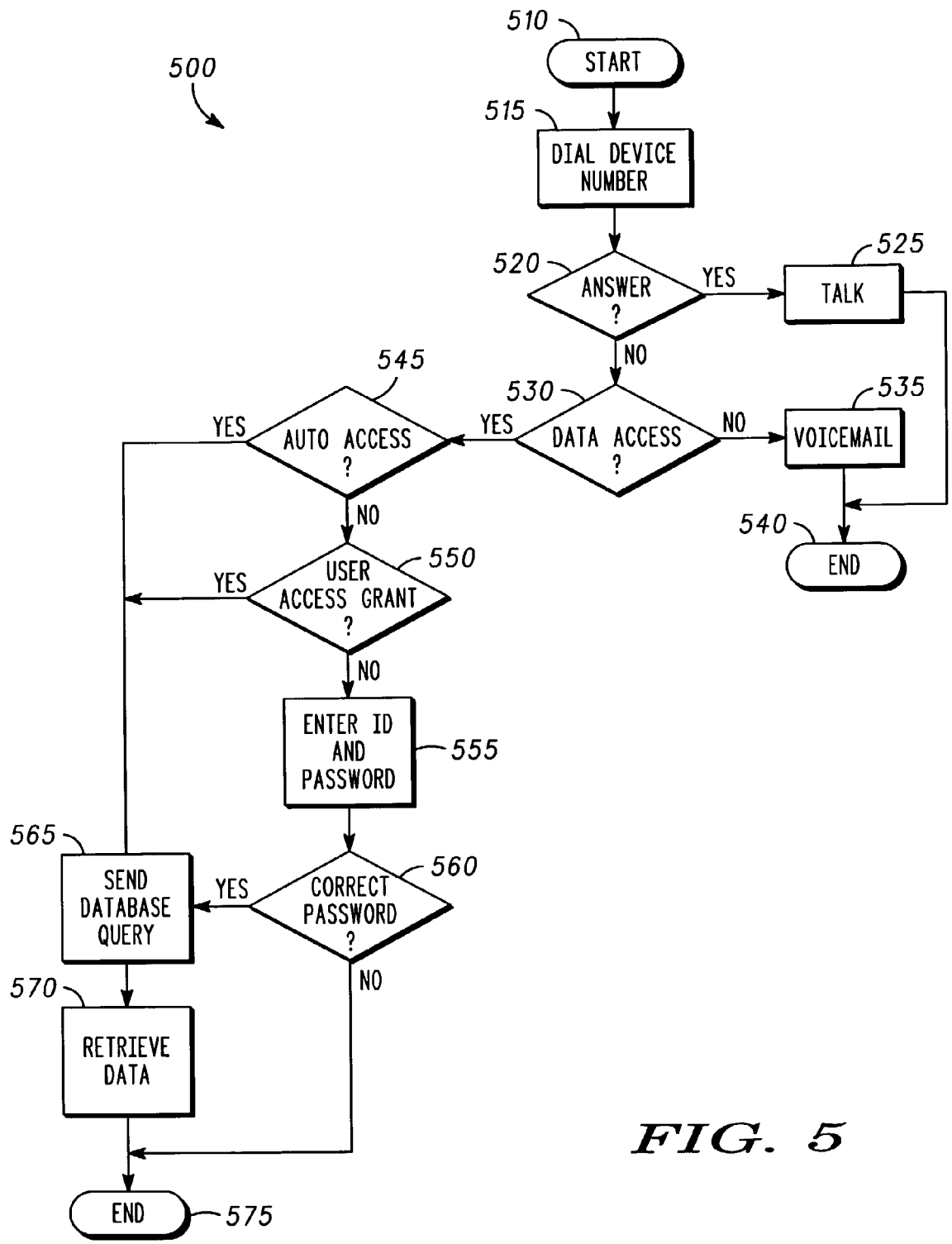
FIG. 5 is an exemplary flowchart outlining the operation of a remote data access module according to a first embodiment.

FIG. 5 is an exemplary flowchart 500 outlining the operation of the remote data access module 210 according to a first embodiment. In step 510, the flowchart begins. In step 515, the remote data access module 210 can be used to call a second device. For example, the remote data access module 210 can be used to dial a telephone number of a second voice and data wireless device. In step 520, the remote data access module 210 can determine if the second device has answered the call. If so, in step 525, the remote data access module 210 can connect a voice call and allows the users of the devices to talk. If there is no answer, in step 530, the remote data access module 210 can determine if a user wants data access on the called device. For example, the user may be prompted with a message including a data access option and other options. The user may then use a keypad, a microphone, or any other input to indicate whether data access is desired. If no data access is desired or if a voicemail option is selected, in step 535, the remote data access module 210 may forward the user to voicemail. In step 540, the flowchart can end.

If data access is desired, in step 545, the remote data access module 210 can determine if an automatic remote data access function is available and the criteria are met. For example, the called device may automatically grant data access if it recognizes a caller's telephone number, identity module number, or other identifying information. If the automatic access is accepted, the flowchart can advance to step 565. If automatic access is not granted, in step 550, the remote data access module 210 can determine if a user of the called device grants access. For example, the called device user may not answer the, incoming call, but may recognize the caller's caller identification. The called device user may then be prompted for an input at the called device and the user can manually enter a code or other input to allow the caller to use a remote data access function. If the user grants access, the flowchart can advance to step 565. if the user does not manually grant access, in step 555, the remote data access module 210, can display a prompt for the caller to enter a passcode such as a user identification and/or a password. In step 560, the remote data access module 210 can determine if the passcode is correct. If the passcode is incorrect, the remote data access module 210 may display an error message, may allow extra attempts, or may simply end the process in step 575. If the passcode is correct, the remote data access module 210 advances to step 565. In step 565, the remote data access module 210 can send a database query to the called device to retrieve data from the called device. In step 570, the remote data access module 210 retrieves the data from the called device. In step 575, the flowchart ends.

Figure 6:
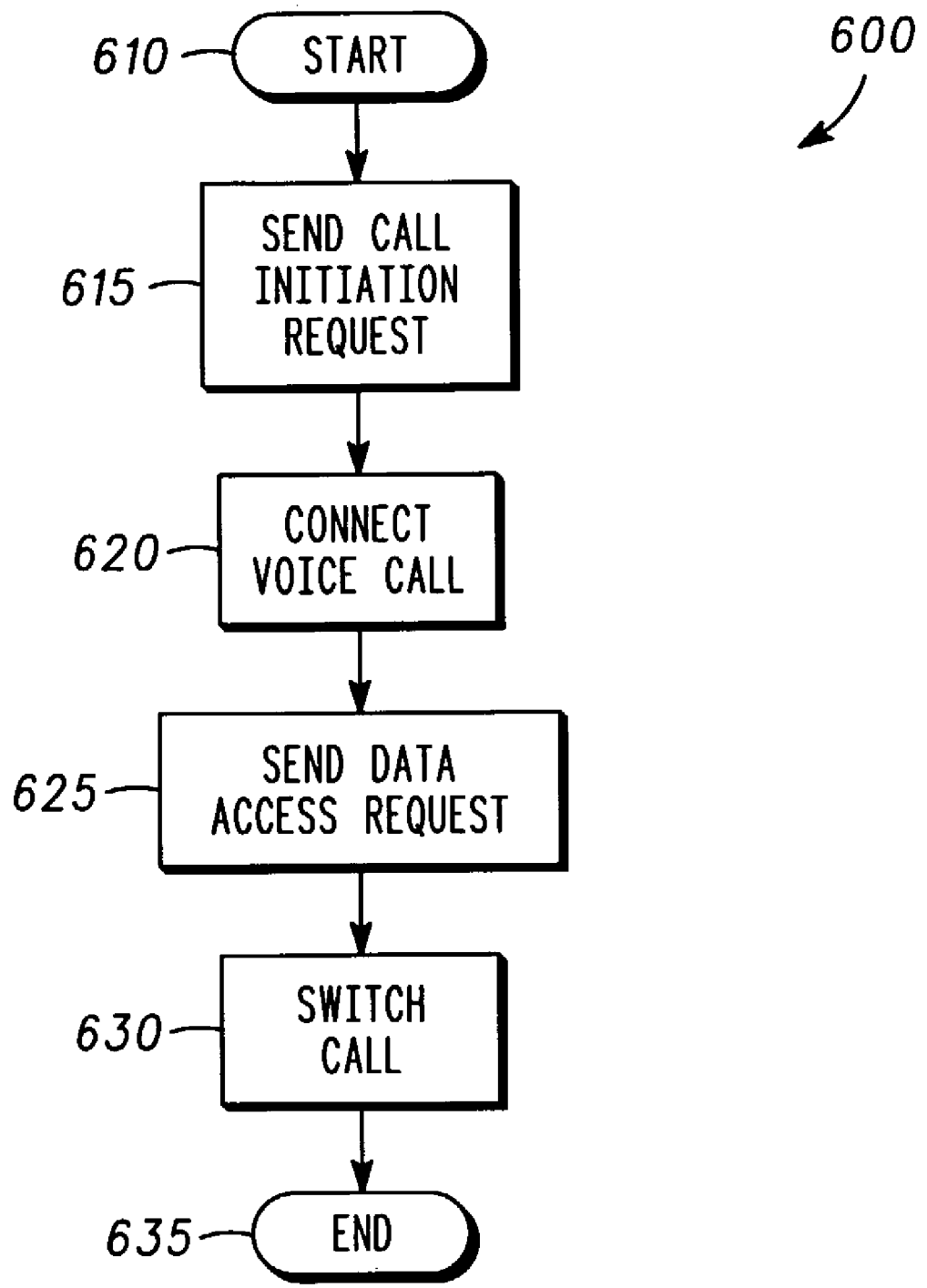
FIG. 6 is an exemplary flowchart outlining the operation of the remote data access module according to a second embodiment.

FIG. 6 is an exemplary flowchart 600 outlining the operation of the remote data access module 210 according to a second embodiment. In step 610, the flowchart begins. In step 615, the remote data access module 210 sends a call initiation request for a call to a second voice and data wireless device. In step 620, the remote data access module 210 connects a voice call. In step 625, the remote data access module 210 sends a data access request. In step 630, the remote data access module 210 switches the voice call to a data call to establish a data access connection. In step 635, the flowchart ends. Additional features of the flowchart 500 may be incorporated into the flowchart 600 for additional functionality, however such features are not necessary for operation of the flowchart 600.

Figure 7:
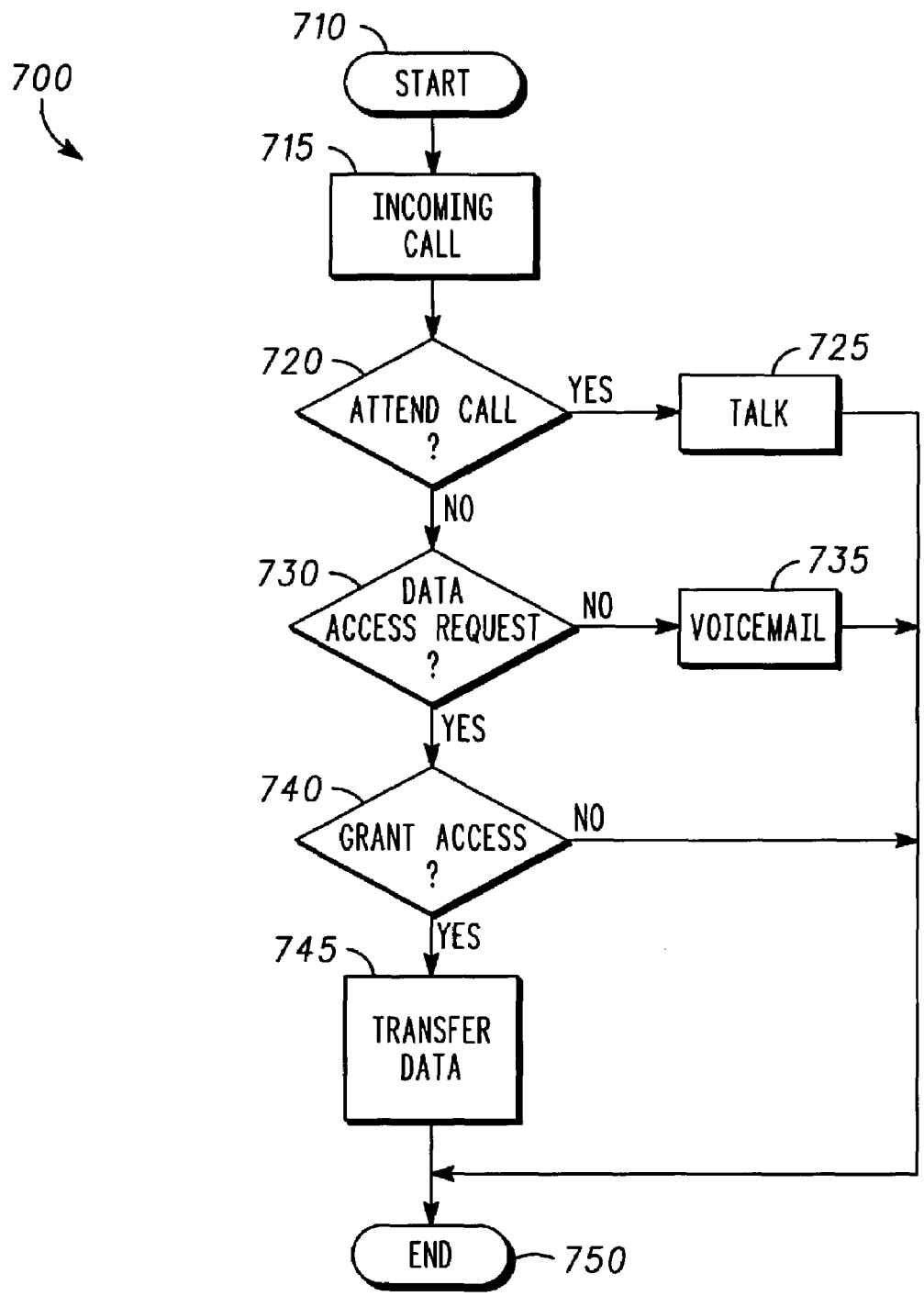
FIG. 7 is an exemplary flowchart outlining the operation of the remote data access module according to a third embodiment.

FIG. 7 is an exemplary flowchart 700 outlining the operation of the remote data access module 210 according to a third embodiment In step 710, the flowchart begins. In step 715, the remote data access module 210 can receive an incoming call from a remote device such as a remote voice and data wireless device. In step 720, the remote data access module 210 can determine if a user attends die call. If the call is answered, in step 725, the remote data access module 210 can connect the call for voice communications. If the call is not answere4, in step 730, the remote data access module 210 can determine if a data access request is requested. If no data access requests is requested, in step 735, the remote data access module 210 can forward the call to a voicemail system. If a data access is requested, in step 740, the remote data access module 210 can determine if access should be granted based on the various techniques discussed above. If access is not granted, the remote data access module 210 can advance to step 750 If access is granted, in 745, the voice call is switched to a data call and data is transferred between the devices. In step 750, the flowchart ends.

Figure 8:
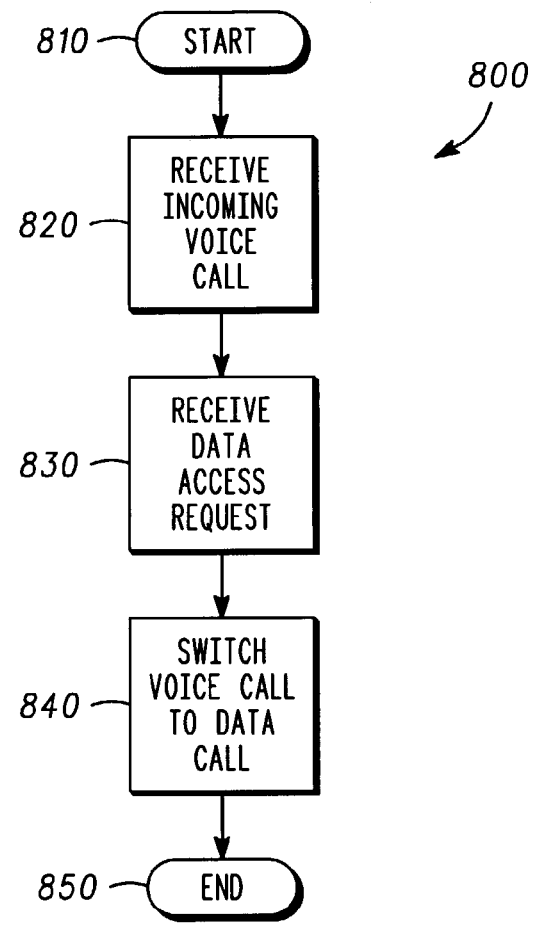
FIG. 8 is an exemplary flowchart outlining the operation of the remote data access module according to a fourth embodiment.
Figure 9:
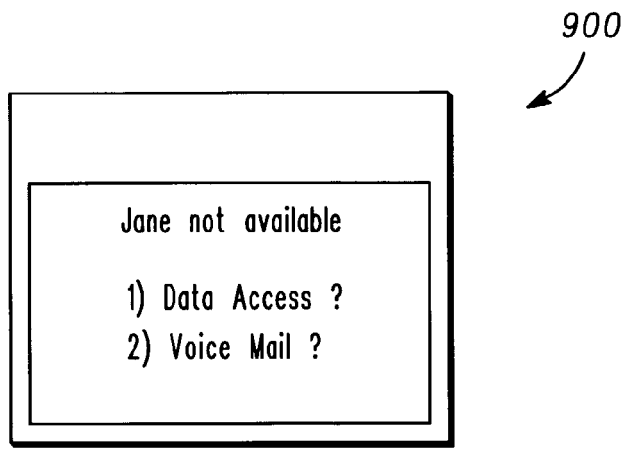

FIG. 8 is an exemplary flowchart 800 outlining the operation of the remote data access module 210 according to a fourth embodiment. In step 810, the flowchart begins. In step 820, the remote data access module 210 can receive an incoming voice call from a second voice and data wireless device. In step 830, the remote data access module 210 can receive a data access request. Tin step 840, the remote data access module 210 can switch the voice call to a data call to establish a data access connection. In step 850, the flowchart ends. Additional features of the flowchart 700 may be incorporated into the flowchart 800 for additional functionality, however such features are not necessary for operation of the flowchart 800.

FIGS. 9-13 are exemplary illustrations of screens 900, 1000, 1100, 1200, and 1300 that can be displayed on a voice and data wireless device 200 according to preferred embodiments. For example, a first user of the voice and data wireless device 200 may desire information from a second user of a second voice and data wireless device. In particular, the user of the second voice and data wireless device may have important information stored on the second voice and data wireless device. This important information may be an important phone number, contact information, datebook information, or any other information. If the second user is unavailable, but the second user's device is on, the first user may use a remote access feature. In particular, the first user can call the second device. If the second user does not answer, the voice and data wireless device 200 can display the screen 900 giving the first user an option for remote data access and possibly other options such as voicemail access. Alternatively, options may be sent audibly to the first user. If the first user selects a data access option, the first user may then be prompted for a user identification and a password using screen 1000. The password may then be automatically validated. Alternatively, if the password is incorrect, as an alternative to password validation, or for additional security, the second user may be prompted to allow or decline access using screen 1100. A voice and data wireless device may alternatively use an automatic access mode where data access permission can be pre-granted to specific users. However, the second user may still be alerted before a remote data access begins. As another example, a permissive access mode may be used where the second user can have an option of granting or denying access. If the second user grants access, the first user may be shown screen 1200 and will be allowed access to data on the second voice and data wireless device. The first user may be granted access to all data or may only be granted access to selected data. Permission to selected files may be give on a group basis or on an individual basis. The first user can then send a database query to the second voice and data wireless device. A real time database search may then be performed on the second voice and data wireless device and resulting data can be sent to the first voice and data wireless device 200. For example, the first user may see screen 1300. This screen may also be shown to the second user.

As another example, if a user does not have access to their own voice and data wireless device 200, the user may use remote data access. For example, if the user forgets their voice and data wireless device 200, the user may still obtain data from it. For example, they may place a voice call on a compatible device and switch the call to a data call for data access.

The method of this disclosure is preferably implemented on a programmed processor. However, the network controller 120, the network remote data access module 110, the controller 220, and/or the remote data access module 210 may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this invention.

While this disclosure has been described with specific embodiments thereof, it is evident that many alternatives, modifications, and variations will be apparent to those skilled in the art. For example, various components of the embodiments may be interchanged, added, or substituted in the other embodiments. As another example, all functions performed on the controllers may be performed on the remote data access modules and vice versa. Accordingly, the preferred embodiments of the disclosure as set forth herein are intended to be illustrative, not limiting. Various changes may be made without departing from the spirit and scope of the disclosure

What is claimed is:

1. A method at a network controller on a wireless network of remote data access between a first voice and data wireless device and a second voice and data wireless device remote from the first voice and data wireless device, the method comprising:
   receiving a call initiation request from the first voice and data wireless device;
   responsive to the call initiation request, initiating a voice call between the first voice and data wireless device and the second voice and data wireless device;
   determining whether the voice call has been answered by the second voice and data wireless device;
   if the voice call has not been answered by the second voice and data wireless device, receiving a data access request from the first voice and data wireless device, the data access request being separate from the call initiation request and indicating a request to access data from the second voice and data wireless device;
   acknowledging the data access request; and
   in response to the data access request, switching the voice call to a data call to establish a data access connection between the first voice and data wireless device and the second voice and data wireless device to thereby allow the first voice and data wireless device to retrieve data from the second voice and data wireless device,
   wherein the first voice and data wireless device and the second voice and data wireless device are portable.

2. The method at a network controller of remote data access according to claim 1, further comprising determining if the second voice and data wireless device is camped on the network.

3. The method at a network controller of remote data access according to claim 1, further comprising determining whether the second voice and data wireless device is subscribed for a data access request service.

4. The method at a network controller of remote data access according to claim 1, further comprising:
   if the voice call has not been answered by the second voice and data wireless device, sending a data access request option to the first voice and data wireless device prior to receiving the data access request from the first voice and data wireless device; and receiving the data access request from the first voice and data wireless device responsive to the data access request option.

5. The method at a network controller of remote data access according to claim 4, wherein sending a data access request option to the first voice and data wireless device further comprises sending a feature option to the first voice and data wireless device, the feature option including the data access request option and a voice mail request option.

6. The method at a network controller of remote data access according to claim 1, further comprising:

sending a security prompt to the first voice and data wireless device; and receiving a passcode from the first voice and data wireless device.

7. The method at a network controller of remote data access according to claim 1, further comprising determining an end of the data access connection by receiving an acknowledge data complete signal.

8. The method at a network controller of remote data access according to claim 1, wherein the network controller comprises a base transceiver station on a cellular network.

9. A system for remote data access between a first voice and data wireless device and a second voice and data wireless device over a wireless network, wherein the first voice and data wireless device and the second voice and data wireless device are portable, the system comprising:

a network controller coupled to the wireless network, the network controller configured to control operations on the wireless network; and a remote data access module coupled to the network controller, the remote data access module configured to:

receive a call initiation request from the first voice and data wireless device at the network controller, responsive to the call initiation request, initiate a voice call between the first voice and data wireless device and the second voice and data wireless device, determine whether the voice call has been answered by the second voice and data wireless device;

if the voice call has not been answered by the second voice and data wireless device, receive a data access request from the first voice and data wireless device, the data access request being separate from the call initiation request and indicating a request to access data from the second voice and data wireless device, acknowledge the data access request, and in response to the data access request, switch the voice call to a data call to establish a data access connection between the first voice and data wireless device and the second voice and data wireless device to thereby allow the first voice and data wireless device to retrieve data from the second voice and data wireless device.

10. The system for remote data access according to claim 9, wherein the remote data access module is further configured to determine whether the second voice and data wireless device is subscribed for a data access request service.

11. The system for remote data access according to claim 9 wherein the remote data access module is further configured to:

send at least a data access request option to the first voice and data wireless device prior to receiving the data access request from the first voice and data wireless device if the voice call has not been answered by the second voice and data wireless device, and receive the data access request from the first voice and data wireless device responsive to the data access request option.

12. The system for remote data access according to claim 9, wherein the remote data access module is further configured to send a security prompt to the first voice and data wireless device and receive a passcode from the first voice and data wireless device.

* * * * *